US009829120B1

(12) United States Patent
Berteletti

(10) Patent No.: US 9,829,120 B1
(45) Date of Patent: Nov. 28, 2017

(54) CABLE MANAGEMENT CLIP ASSEMBLIES, SYSTEMS, AND METHODS

(71) Applicant: VCE Company, LLC, Richardson, TX (US)

(72) Inventor: Michael K. Berteletti, South Easton, MA (US)

(73) Assignee: VCE IP HOLDING COMPANY LLC, Richardson, TX (US)

( * ) Notice: Subject to any disclaimer, the term of this patent is extended or adjusted under 35 U.S.C. 154(b) by 0 days.

(21) Appl. No.: 14/464,375

(22) Filed: Aug. 20, 2014

(51) Int. Cl.
*F16L 3/22* (2006.01)
*F16L 3/10* (2006.01)

(52) U.S. Cl.
CPC ............. *F16L 3/221* (2013.01); *F16L 3/1058* (2013.01)

(58) Field of Classification Search
CPC . F16L 3/221; F16L 3/227; F16L 3/223; F16L 3/22; F16L 3/222; F16L 3/02; F16L 3/08; F16L 3/12; F16L 3/1207; F16L 3/137; F16L 3/16; F16L 3/18; F16L 3/20; F16L 3/237; Y10T 24/3444; A47F 7/0021; A47F 7/0028; A47F 7/0035; B25H 3/04
USPC .................. 24/339; 248/68.1; 211/60.1, 70.6
See application file for complete search history.

(56) References Cited

U.S. PATENT DOCUMENTS

| | | | | |
|---|---|---|---|---|
| 3,894,706 A * | 7/1975 | Mizusawa | ..................... | 248/68.1 |
| 4,781,608 A * | 11/1988 | Hillmann | ...................... | 439/212 |
| 4,899,964 A * | 2/1990 | Sick | .............................. | 248/68.1 |
| 5,484,066 A * | 1/1996 | Luisi | ............................. | 211/69.8 |
| 6,109,569 A * | 8/2000 | Sakaida | .......................... | 248/75 |
| 6,241,198 B1 * | 6/2001 | Maruyama | ...................... | 248/49 |
| 6,513,767 B1 * | 2/2003 | Rodgers | ................ | F16L 3/1025 |
| | | | | 24/16 PB |
| 6,629,675 B1 * | 10/2003 | Bjorklund et al. | ............. | 248/49 |
| 7,051,983 B2 * | 5/2006 | Sirignano | ................ | H02G 3/32 |
| | | | | 248/68.1 |
| 7,745,738 B2 * | 6/2010 | Nakayama | ..................... | 174/480 |
| 8,464,984 B2 * | 6/2013 | Laursen | ....................... | 248/68.1 |
| 2010/0006709 A1 * | 1/2010 | Bleus et al. | .................. | 248/68.1 |
| 2010/0258685 A1 * | 10/2010 | Gardner et al. | ............. | 248/68.1 |
| 2011/0084039 A1 * | 4/2011 | Walters et al. | ............ | 211/85.13 |
| 2014/0259620 A1 * | 9/2014 | Hicks | ...................... | F16L 3/223 |
| | | | | 29/525.01 |

* cited by examiner

*Primary Examiner* — Abigail Troy
(74) *Attorney, Agent, or Firm* — Jenkins, Wilson, Taylor & Hunt, P.A.

(57) ABSTRACT

The present subject matter relates to devices, systems, and methods for organizing and aggregating cables. In one aspect, a cable management device is provided in which a plurality of cable clips are coupled to a connector bar. In this arrangement, the plurality of cable clips are held at unique positions with respect to one another along a length of the connector bar and can be configured to receive and hold one or more cables in similarly unique positions with respect to one another.

13 Claims, 3 Drawing Sheets

CABLE MANAGEMENT CLIP ASSEMBLIES, SYSTEMS, AND METHODS

TECHNICAL FIELD

The subject matter disclosed herein relates generally to cable management systems and methods. More particularly, the subject matter disclosed herein relates to the configuration and use of wire routing clips.

BACKGROUND

In computer data center rooms and other network system facilities, large numbers of cables can be connected to one or more components to provide data and power connections to the components. In situations where the components need to be moved or replaced, however, the array of cables often need to be disconnected, moved, rearranged, and/or reconnected to the corresponding components. In such situations, a technician must label each of the connector cables prior to removing them from a device, and the labels must be consulted again upon reconnection to determine where they need to be plugged in correctly. This process can be time consuming and tedious. In addition, missing, incorrect, or poorly identified labels can lead to errors and cost large amounts of time to be expended to correct.

SUMMARY

In accordance with this disclosure, devices, systems, and methods for organizing and aggregating cables are provided. In one aspect, a cable management device is provided in which a plurality of cable clips are coupled to a connector bar. In this arrangement, the plurality of cable clips are held at unique positions with respect to one another along a length of the connector bar and can be configured to receive and hold one or more cables in similarly unique positions with respect to one another. Although an aspect of the subject matter disclosed herein have been stated hereinabove, and which are achieved in whole or in part by the presently disclosed subject matter, other aspects will become evident as the description proceeds when taken in connection with the accompanying drawings as best described hereinbelow.

BRIEF DESCRIPTION OF THE DRAWINGS

The features and advantages of the present subject matter will be more readily understood from the following detailed description which should be read in conjunction with the accompanying drawings that are given merely by way of explanatory and non-limiting example, and in which.

DETAILED DESCRIPTION

The present subject matter provides devices, systems, and methods for organizing and aggregating cables. In one aspect, the present subject matter provides a cable management clip assembly that can be used to separate cables and arrange the cables in a manner such that they maintain a unique position with respect to one another whether attached to or removed from an associated component.

Figure 1A:
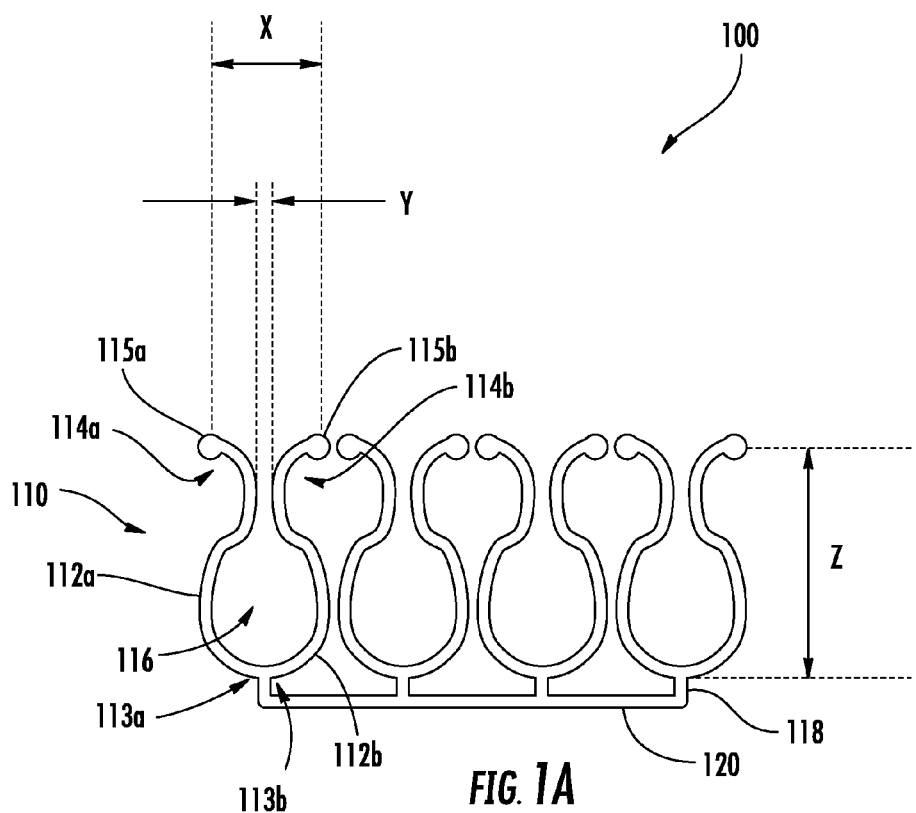
FIGS. 1A, 1B, and 2 are side views of cable management clip assemblies according to various embodiments of the presently disclosed subject matter.
Figure 1B:
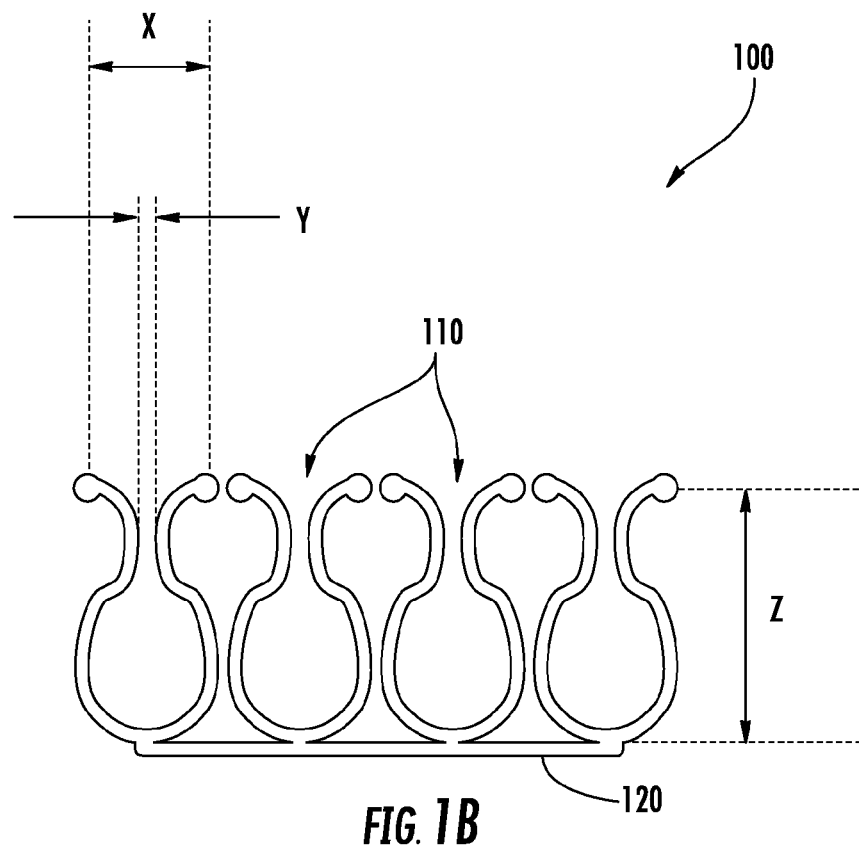
Figure 2:
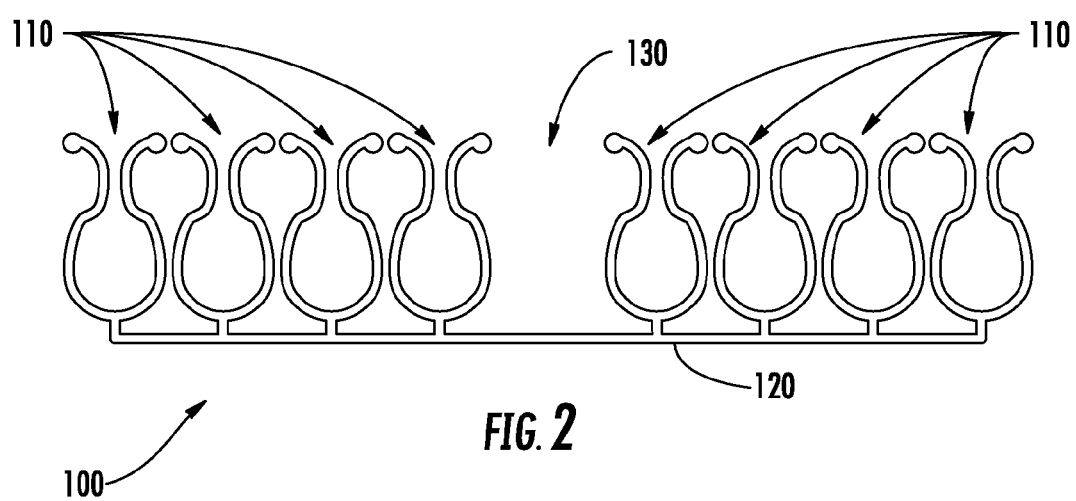

In particular, for example, FIGS. 1A, 1B, and 2 each illustrate embodiments of a cable management clip assembly, generally designated 100, in which a plurality of cable clips 110 are each configured to receive and hold one or more cables therein. Each of cable clips 110 can include a first leg 112a and a second leg 112b. A first end 113a of first leg 112a can be connected to a first end 113b of second leg 112b, and first and second legs 112a and 112b can extend in generally the same direction from this common connection such that a second end 114a of first leg 112a is near a second end 114b of second leg 112b.

Specifically, as shown in FIGS. 1A, 1B, and 2, first and second legs 112a and 112b can each have a substantially S-shaped profile arranged in a back-to-back arrangement such that they curve from their connected first ends 113a and 113b first outwardly away from one another and then inwardly toward one another to define a cable-holding region 116 between first and second legs 112a and 112b. Cable-holding region 116 can be sized such that it is large enough to hold the cable in place but small enough so that any connecting hardware (e.g., plugs or other terminal ends) do not fit through. In addition, second ends 114a and 114b of first and second legs 112a and 112b can be configured to curve back away from each other such that cable clips 110 have a generally urn-shaped profile as shown in the Figures.

In this configuration, second ends 114a and 114b of first and second legs 112a and 112b can be spaced apart a grip distance x such that a user can easily press second ends 114a and 114b away from or towards each other to open or close the clip as discussed below. In addition, the flared ends of second ends 114a and 114b of first and second legs 112a and 112b can facilitate insertion of a cable element into one of cable clips 110. In particular, a minimum gap distance y between first leg 112a and second leg 112b can be sized to be smaller than a width of the cable to be held by the selected one of cable clips 110, but the wider spacing between first and second leg 112a and 112b at grip distance x can allow a cable pressed towards cable-holding region 116 to exert an outward force on second ends 114a and 114b (i.e., similar to operation of a cam element) to cause the gap between first and second legs 112a and 112b to widen to an extent necessary to allow the cable to pass into cable-holding region 116.

In this regard, each of cable clips 110 can have a configuration substantially similar to that of a nylon twist clip that is commonly used in electrical appliances for managing and routing electric cables. The conventional design of these twist clips offers the ability to easily add or remove wires by separating the ends of the clips (i.e., to "open" the clip). Specifically, for example, first and second legs 112a and 112b can be configured to be movable with respect to one another, however, such that second ends 114a and 114b can be moved away from one another to widen the gap therebetween. Specifically, for example, one or both of first leg 112a and second leg 112b can be resiliently bendable such that second ends 114a and 114b can be flexed away from one another under application of a force and can recover back to their original positions when the force is removed. Alternatively or in addition, first ends 113a and 113b of first leg 112a to second leg 112b can be connected at a hinge point (e.g., the connection acting as a living hinge), wherein application of a force to second ends 114a and 114b of first and second legs 112a and 112b can again cause second ends 114a and 114b to move apart, and release of the force can allow second ends 114a and 114b to recover back to their original positions.

In any configuration, to assist the user in pushing second ends 114a and 114b apart, second ends 114a and 114b can be provided with enlarged or nubbed ends 115a and 115b, respectively, which can be more easily gripped and manipulated by a user. To enable this resilient bending of first and second leg 112a and 112b with respect to one another, cable clips 110 can be composed of a nylon or similar material. Such materials are flexible and can thus be maneuvered in tight spaces. In addition, such materials are also easily cut with shears or wire cutters for custom applications.

In any configuration, cables having diameters greater than the minimum gap distance y can be passed between first and second legs 112a and 112b into cable-holding region 116. Accordingly, each of cable clips 110 can be sized to accommodate any of a variety of standard data and power cabling (e.g., fiber or copper cables). Once the cable is positioned within cable-holding region 116, however, the relatively small size of minimum gap distance y can help to keep the cable retained in cable-holding region 116 unless a force is again exerted to separate second ends 114a and 114b. In addition, in configurations were second ends 114a and 114b flare outwardly as shown in FIGS. 1A, 1B, and 2, second ends 114a and 114b can be overlapped and interlocked (i.e., twisted together) to effectively "close" cable clip 110 (i.e., by eliminating the gap between second ends 114a and 114b) and further ensure that a cable retained therein won't slip out similarly to conventional twist clips.

In contrast to conventional twist clips, which are generally configured to anchor the retained cable to a particular structure (e.g., using an adhesive- or insert-style base for attachment to surfaces or pre drilled holes), however, a plurality of cable clips 110 of cable management clip assembly 100 can be configured to be coupled to one another in a linear array. In this regard, to hold the plurality of cable clips 110 together, each of cable clips 110 can be coupled to a common connector bar 120. For example, as shown in FIG. 1A, each of cable clips 110 can be offset from connector bar 120 by a standoff 118, which can provide some additional flexibility to the connection of the respective one of cable clips 110 to connector bar 120 to allow for cable clips 110 to be maneuvered with respect to one another when inserting cables, removing cables, or positioning cable management clip assembly 100 as a unit with respect to a connected device. In an alternative configuration shown in FIG. 1B, first ends 113a and 113b of first and second legs 112a and 112b can be directly coupled to connector bar 120. In this configuration, the flexibility of the material used for cable clips 110 provides the desired level of flexibility versus rigidity for maneuvering cable clips 110 with respect to one another.

In any configuration, cable clips 110 can be spaced along a length of connector bar 120. The particular distances at which cable clips 110 are spaced can be selected based on conventional layouts (e.g., observed equipment tends to fall within a narrow range of distances between connectors), or they can be positioned in custom spacing arrangements based on the configuration of a particular component with which a series of cables is to be associated. In any layout, it can be advantageous for cable clips 110 to be positioned as compactly as possible next to one another while still allowing sufficient spacing for users to manipulate second ends 114a and 114b of first and second legs 112a and 112b of a given one of cable clips 110 to insert or remove a cable and/or to open or close the clip.

Regardless of the particular configuration, cable management clip assembly 100 can be configured such that multiple cables can not only be retained together, but the arrangement of a plurality of cable clips 110 next to each other on connector bar 120 further enables the retained cables to be held in a consistent ordered arrangement. Specifically, for example, connector bar 120 can be composed of a material selected to provide sufficient rigidity to keep the plurality of cable clips 110 in order. For instance, in some embodiments, the plurality of cable clips 110 extend away from connector bar 120 in substantially the same direction, and cable clips 110 can be arranged on connector bar 120 in a substantially linear array and can be substantially coplanar with respect to one another as shown in FIGS. 1A through 3. In this way, all of the cables held by cable management clip assembly 100 can be held in a substantially parallel arrangement, which can facilitate the ordered connection or disconnection of the cables with a linear array of connection ports. That beings said, connector bar 120 can have some degree of flexibility to help allow cable clips 110 to be maneuvered with respect to one another when inserting cables.

Figure 3:
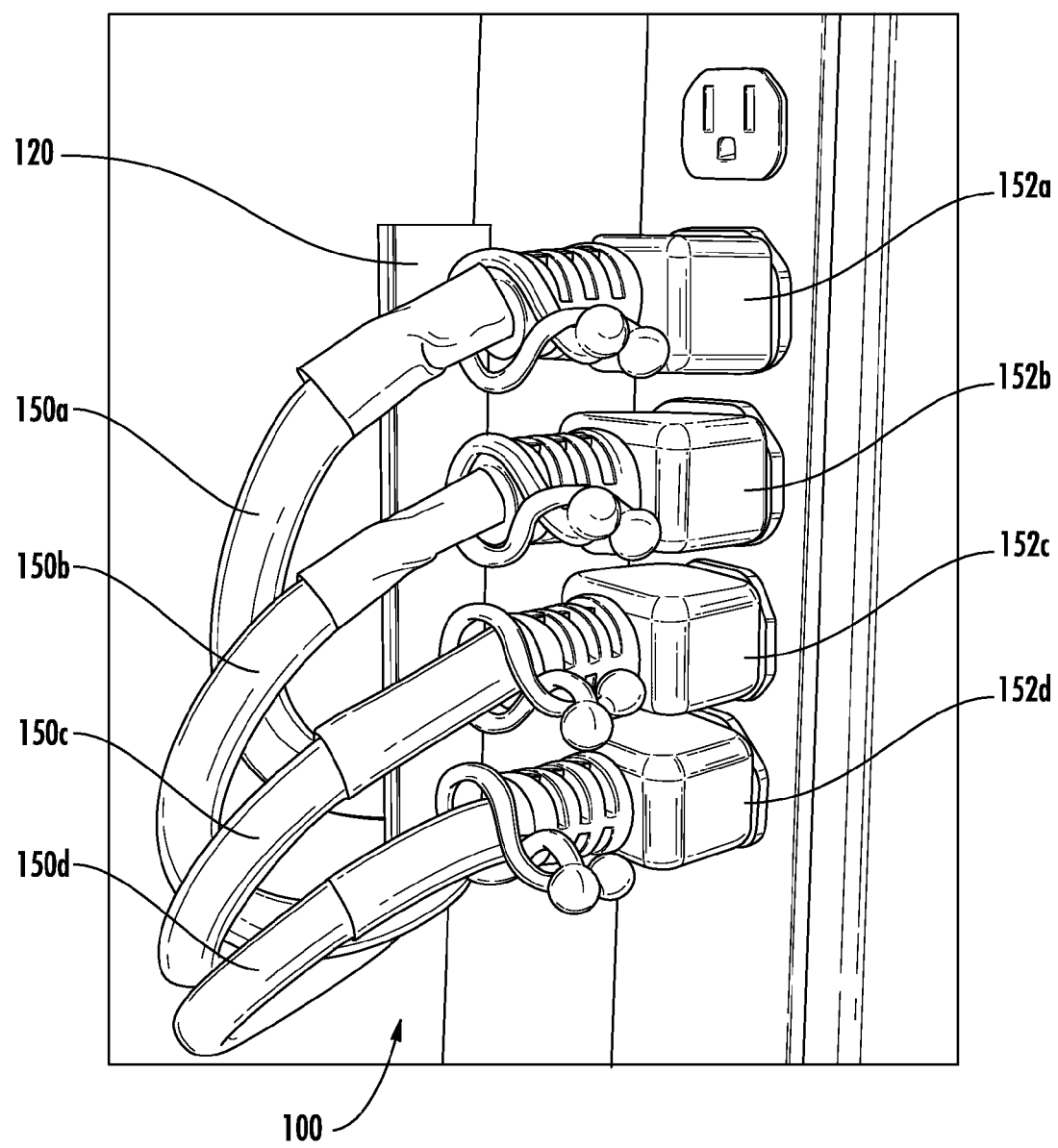
FIG. 3 is a perspective side view of a cable management clip assembly holding a plurality of cables according to an embodiment of the presently disclosed subject matter.

Such consistent ordering can be advantageous in a wide range of applications. For example, in situations where a component within a networked system needs to be moved or replaced, cable management clip assembly 100 can be used by a technician to manage the connecting cables while a component is replaced and allow the connected cables to be ordered for rapid replacement upon reconnection of the cabled components. As shown in FIG. 3, for example, an exemplary installation of cable management clip assembly 100 is provided. In this arrangement, four cables 150a, 150b, 150c, and 150d can each be held in a separate one of cable clips 110 (i.e., in a one-to-one arrangement) of cable management clip assembly 100 in a selected order. As discussed above, each of cable clips 110 can be sized such that connector ends 152a, 152b, 152c, and 152d are too large to fit through the openings of cable clips 110, thereby helping to maintain cables 150a, 150b, 150c, and 150d in a fixed ordering.

In this way, the use of cable management clip assembly 100 can eliminate the need for labeling of individual cables prior to removal or the need to examine individual labels for proper connection. Instead, cable management clip assembly 100 can be attached and secured to a plurality of cables to allow the removal of the connected cables as an assembly. This use of cable management clip assembly 100 can minimize the time to re-cable a device and improve the accuracy of the reinstallation. As a result, this functionality can be particularly useful, for example, to field service personnel working in the confines of racks. Similarly, where a component needs to be removed from a rack for shipping, the use of cable management clip assembly 100 to maintain cables in a defined relative position can advantageously enable rapid re-assembly at the destination.

In another exemplary application, cable management clip assembly 100 can enable a cable assembly to be pre-staged, including the relative position of a cable to a component, to allow for easier installation of a new component into a networked system. In this way, cables are pre-arranged and ready for placement in the rack or appliance. Again, the ability of cable management clip assembly 100 to maintain a series of cables in a defined order can minimize the time needed to connect the cables to the device and can further improve the accuracy of the connections.

In addition, those having ordinary skill in the art will recognize that, in any use, cable management clip assembly 100 is designed to order cables. As a result, there exists a wide variety of other applications and connection options for cable management clip assembly 100. The cost of cable management clip assembly 100 is minimal since the materials are inexpensive, and cable management clip assembly 100 can further be easy to manufacture.

In addition, customizable versions are possible utilizing standard pieces that can be arranged in desired configurations. Specifically, for example, FIGS. 1A, 1B, and 3 illustrate configurations in which four of cable clips 110 are coupled to connector bar 120. FIG. 2 illustrates a second exemplary configuration in which eight cable clips 110 are coupled to connector bar 120. As further shown in FIG. 2, a spacer gap 130 is positioned between two sets of four of cable clips 110, which can help a technician to easily group and identify different sets of cables while still maintaining the cables in an ordered array (e.g., for switch equipment that has separated port groups or gaps in the cabling configuration). Of course, those having skill in the art will appreciate that these illustrated configurations are merely exemplary, and cable management clip assembly 100 can include as many of cable clips 110 as are practical for a given application. In some embodiments, for example, cable management clip assembly 100 can include groups of 16 or 24 cable clips 110 to correspond to standard rack switch or port card configurations. Furthermore, the size and configuration of cable management clip assembly 100 can be customized by the end user using wire cutters or scissors to select the particular number of cable clips 110 to align with a pattern of a given component that keeps the cables in place and in order. In this way, although it can be practical and cost effective to produce cable management clip assembly 100 in standard configurations, the assembly can be easily adapted for use in many different applications (e.g., by removing unused ones of cable clips 110).

The present subject matter can be embodied in other forms without departure from the spirit and essential characteristics thereof. The embodiments described therefore are to be considered in all respects as illustrative and not restrictive. Although the present subject matter has been described in terms of certain preferred embodiments, other embodiments that are apparent to those of ordinary skill in the art are also within the scope of the present subject matter.

What is claimed is:

1. A cable management device comprising:
   a plurality of cable clips each configured to receive and hold one or more cables; and
   a connector bar non-removably coupled to each of the plurality of cable clips;
   wherein each of the plurality of cable clips are coupled to the connector bar by a standoff;
   wherein the plurality of cable clips are held at fixed, unique positions with respect to one another along a length of the connector bar;
   wherein each of the plurality of cable clips comprises a first leg having a first end and a second end substantially opposing the first end, and a second leg having a first end and a second end substantially opposing the first end;
   wherein the connector bar comprises a flexible material such that the plurality of cable clips are movable with respect to one another; and
   wherein the second end of the first leg and the second end of the second leg are movable with respect to one another between at least a first position in which the second end of the first leg is spaced apart from the second end of the second leg by a gap and a second position in which the second end of the first leg overlaps and interlocks with the second end of the second leg.

2. The cable management device of claim 1, wherein the plurality of cable clips comprises four or more cable clips coupled to the connector bar.

3. The cable management device of claim 1, wherein each of the plurality of cable clips extend away from the connector bar in substantially the same direction.

4. The cable management device of claim 1, wherein the plurality of cable clips are arranged on the connector bar in a substantially linear array.

5. The cable management device of claim 4, wherein each of the plurality of cable clips in the substantially linear array are aligned in a common plane.

6. A cable management system comprising:
   a plurality of cable clips each configured to receive and hold one or more cables, the plurality of cable clips comprising a number of cable clips selected to correspond to a number of cables configured for connection to a discrete linear group of component ports; and
   a connector bar non-removably coupled to each of the plurality of cable clips;
   wherein each of the plurality of cable clips are coupled to the connector bar by a standoff;
   wherein the plurality of cable clips are held at fixed, unique positions with respect to one another along a length of the connector bar corresponding to relative positions of the discrete linear group of component ports;
   wherein each of the plurality of cable clips comprises a first leg having a first end and a second end substantially opposing the first end, and a second leg having a first end and a second end substantially opposing the first end;
   wherein the connector bar comprises a flexible material such that the plurality of cable clips are movable with respect to one another; and
   wherein the second end of the first leg and the second end of the second leg are movable with respect to one another between at least a first position in which the second end of the first leg is spaced apart from the second end of the second leg by a gap and a second position in which the second end of the first leg overlaps and interlocks with the second end of the second leg.

7. The cable management system of claim 6, wherein each of the plurality of cable clips extend away from the connector bar in substantially the same direction.

8. The cable management system of claim 6, wherein the plurality of cable clips are arranged on the connector bar in a substantially linear array.

9. The cable management system of claim 8, wherein each of the plurality of cable clips in the substantially linear array are aligned in a common plane.

10. The cable management system of claim 6, wherein the plurality of cable clips are spaced apart from one another by distances corresponding to relative spacing between the discrete linear group of component ports.

11. The cable management system of claim 6, wherein the plurality of cable clips are arranged in two or more subgroups corresponding to two or more respective sub-groupings of the cables; and
   wherein the two or more sub-groups are spaced apart from each other along the length of the connector bar.

12. The cable management system of claim 6, wherein each of the first leg and the second leg of each of the plurality of cable clips have a substantially S-shaped profile arranged in a back-to-back arrangement such that the first leg and the second leg both curve first outwardly from their first ends away from one another and then inwardly toward one another to define a cable-holding region between the first leg and the second leg.

13. A cable management device comprising:
   a plurality of cable clips each configured to receive and hold one or more cables; and
   a connector bar non-removably coupled to each of the plurality of cable clips;
   wherein the plurality of cable clips are held at fixed, unique positions with respect to one another along a length of the connector bar;
   wherein the connector bar comprises a flexible material such that the plurality of cable clips are movable with respect to one another;
   wherein each of the plurality of cable clips comprises a first leg having a first end and a second end substantially opposing the first end, and a second leg having a first end and a second end substantially opposing the first end;
   wherein each of the first leg and the second leg of each of the plurality of cable clips have a substantially S-shaped profile arranged in a back-to-back arrangement such that the first leg and the second leg both curve first outwardly from their first ends away from one another and then inwardly toward one another to define a cable-holding region between the first leg and the second leg; and
   wherein the second end of the first leg and the second end of the second leg are movable with respect to one another between at least a first position in which the second end of the first leg is spaced apart from the second end of the second leg by a gap and a second position in which the second end of the first leg overlaps and interlocks with the second end of the second leg.

\* \* \* \* \*